(12) United States Patent
Stijl et al.

(10) Patent No.: US 11,146,544 B2
(45) Date of Patent: Oct. 12, 2021

(54) EMULATION OF FEDERATIVE AUTHENTICATION

(71) Applicant: Authasas B.V., The Hague (NL)

(72) Inventors: Menno Stijl, Boskoop (NL); Rik Peters, Etten-Leur (NL); Reinier Maria Van der Drift, Heerenveen (NL)

(73) Assignee: Authasas BV, The Hague (NL)

( * ) Notice: Subject to any disclaimer, the term of this patent is extended or adjusted under 35 U.S.C. 154(b) by 26 days.

(21) Appl. No.: 16/736,988

(22) Filed: Jan. 8, 2020

(65) Prior Publication Data

US 2020/0145407 A1   May 7, 2020

Related U.S. Application Data

(62) Division of application No. 15/124,902, filed as application No. PCT/NL2014/000010 on Mar. 10, 2014, now abandoned.

(51) Int. Cl.
| | |
|---|---|
| *H04L 29/06* | (2006.01) |
| *H04L 9/32* | (2006.01) |
| *G06F 21/33* | (2013.01) |
| *G06F 21/31* | (2013.01) |

(52) U.S. Cl.
CPC .......... *H04L 63/0815* (2013.01); *G06F 21/31* (2013.01); *G06F 21/335* (2013.01); *H04L 9/3213* (2013.01); *H04L 63/08* (2013.01)

(58) Field of Classification Search
CPC ... H04L 63/0815; H04L 9/3213; H04L 63/08; G06F 21/31; G06F 21/335
See application file for complete search history.

(56) References Cited

U.S. PATENT DOCUMENTS

| | | | |
|---|---|---|---|
| 10,958,734 B2* | 3/2021 | Laibson | H04L 9/30 |
| 2003/0046391 A1* | 3/2003 | Moreh | H04L 63/0815 |
| | | | 709/225 |
| 2004/0128506 A1* | 7/2004 | Blakley, III | H04L 63/0815 |
| | | | 713/170 |

(Continued)

OTHER PUBLICATIONS

"Double SSO—A Prudent and Lightweight SSO Scheme, 2010, 75 pages", by Hussein (Year: 2010).*

(Continued)

*Primary Examiner* — Oleg Korsak

(57) ABSTRACT

In some examples, a user device receives, from a source federation site of the source domain, an authentication token for use at a target federation site of the target domain, the authentication token from a user memory that correlates the authentication token to first user credentials useable in the source domain. The user device sends, to the target federation site, the authentication token, and receives, from the target federation site, a request authentication token from a second memory that correlates the authentication token to the request authentication token. The user device sends the request authentication token to an authentication federation emulator that comprises an emulator memory correlating the request authentication token and second user credentials useable in the target domain, and receives the second user credentials from the emulator memory of the authentication federation emulator.

20 Claims, 4 Drawing Sheets

(56) References Cited

U.S. PATENT DOCUMENTS

| | | | | |
|---|---|---|---|---|
| 2004/0128541 A1* | 7/2004 | Blakley, III | ........ | H04L 63/0815 726/9 |
| 2004/0128546 A1* | 7/2004 | Blakley, III | ........ | G06F 21/6245 726/8 |
| 2005/0039008 A1* | 2/2005 | Bhatia | ................. | H04L 63/0815 713/170 |
| 2006/0041933 A1* | 2/2006 | Yakov | ................. | H04L 63/0815 726/8 |
| 2008/0263629 A1* | 10/2008 | Anderson | ........... | H04L 63/0815 726/2 |
| 2011/0289314 A1* | 11/2011 | Whitcomb | .............. | H04L 9/085 713/155 |
| 2013/0125226 A1* | 5/2013 | Shah | ................... | H04L 63/0815 726/7 |

OTHER PUBLICATIONS

"Federated Identity Management and Web Services Security with IBM Tivoli Security Solutions, 2005, 504 pages", by Buecker et al. (Year: 2005).*

"Liberty Alliance Project White Paper Liberty ID-WSF People Service—federated social identity, 2005, 8 pages", by Paul Madsen (Year: 2005).*

"A Modelling Approach to Federated identity and Access management, 2005, 2 pages", by Gaedke et al. (Year: 2005).*

"Step by Step guide on Federated Authentication in Windows Azure Web Role using Windows Azure AppFabric Access Control Service, 2011, 23 pages", by Kumar (Year: 2011).*

International Search Report/Written Opinion; PCT/NL2014/000010; dated Feb. 7, 2014; 9 Pages.

* cited by examiner

EMULATION OF FEDERATIVE AUTHENTICATION

CROSS REFERENCE TO RELATED APPLICATION

This application is a division of U.S. application Ser. No. 15/124,902, having a national entry date of Sep. 9, 2016, which is a national stage application under 35 U.S.C. § 371 of PCT/NL2014/000010, filed Mar. 10, 2014, which are hereby incorporated by reference in their entirety.

FIELD OF THE INVENTION

The present invention relates in general to the problem of recognizing the authenticity of the identity of a person in electronic communication.

BACKGROUND OF THE INVENTION

Internet is an example of a medium that has allowed information services to become easily available for the public. The information may range from rather innocent general information to more sensitive and confidential information, such as medical information, banking information, etc. Thus, the information manager is required to make sure that information is only disclosed to authorized persons, and when a request is received to provide information, the information manager needs to ascertain that the requester actually is the person who he claims to be. One way of doing this is by issuing to the requester credentials such as username and password. When making the request of access, the requester is asked to input his credentials; only if these credentials are recognized as being correct or a correct combination, the access request is accepted.

The process of checking the identity of a person is indicated as "authentication". Normally, the website receiving the request has an associated memory (database) with necessary data relating to persons for identifying them, such as for instance name, address, client number, etc, The database will further have data defining which part of the information managed by this website is accessible to a certain person, for instance a bank account number. The database will further have, for each person, a code which a user will give to identify himself: this code is typically the username. But usernames can be "guessed", and anyone can give a username that is valid per se but not his own. The password serves to check that the username is given by the correct person. Thus, for each person, apart from the username, the database will also store the password. Only if both are correct, the user will be given access.

FIG. 1 is a diagram schematically illustrating the process of normal authentication. The workstation 2 (for instance: PC) of a user 1 is connected to a source domain A (for instance: internal office network). The user wishes to gain access to a target application 3 (for instance: shielded database) in a target domain B (for instance: bank). An example may be: accessing bank account information. The target application 3 is associated with a credentials memory 13, which contains information, illustratively shown in the form of a table, which information includes, for each person that has enrolled with the target domain B or with the target application 3, a name identifying that person (user name), a key code (pass word), and the level of permission associated with this person. When user 1 wishes to gain access to the target application 3, he sends to the target application 3 an Access Request Message ARM, which contains the user credentials UCB for the target application 3, in this case N1 and K1. The target application 3 checks the received values N1 and K1 in its credentials memory 13, and grants permission P1.

It is noted that this check is not actually a guarantee that the person inputting the credentials actually is the person specified in the credentials memory 13. As alternative or in addition to a username and password, biometric data such as fingerprint, iris scan etc, or a chip such as in a credit card, and the like, can be used for increasing the security level.

Authentication is, of course, rather cumbersome for the user. If he is accessing different domains, he needs to give his credentials every time he enters a new domain, and these credentials may differ per domain and/or per application. For the case where he approaches a second domain from within the context of a first domain, a solution has been conceived for this problem, known as "federation", having the advantage that the user needs to input his credentials only once.

FIG. 2 is a diagram schematically illustrating the process of authentication federation. The workstation 2 (for instance: PC) of user 1 is connected to source domain A (for instance: internal office network). The source domain A has an associated user memory (database) 12 containing a table with validated user credentials. It is noted that these credentials apply in source domain A and are therefore different from the user credentials that apply in target application 3. For distinction, these credentials are indicated as NAMEA and KEYA in domain A, and the respective values associated with this user 1 in domain A are indicated as NA1 and KA1.

The user wishes to gain access to a target application 3 (for instance: shielded database) in a target domain B (for instance: bank). Domain B is linked to domain A by an authentication federation service. An example may be: accessing bank account information. The target application 3 is prepared to accept federative authorisation, which means that its memory 13 also, as an alternative to credentials NAME and KEY, contains a different type of key indicated as Request Acceptance Token RAT. For each user who is allowed to use federative authorisation, a unique value for such token has been fixed, in this case R1 for user 1, and this value is stored in the credentials memory 13 in domain B.

Thus, the target application 3 would, in stead of the user's credentials, accept the special token RAT, which is known in target domain B but not in source domain A. However, the target application 3 as such can not handle the request for federative authorisation: for this purpose, the target domain B has a federation site 4 comprising a federation memory 14 (database) containing per user the special token RAT that has issued to the user by the target domain's federation site 4. This federation memory 14 further contains, per user, a special token that has in advance been established between the target domain's federation site 4 and the source domain A. The source domain A, in turn, is associated with a user memory 12, which contains information, illustratively shown in the form of a table, which information includes, for each person that has enrolled with the source domain A, the user credentials NAMEA and KEYA as well as the associated special token for federation.

It is noted that the source domain A may have negotiated federation agreements with more than one target domain, and that the target domain B may have negotiated federation agreements with more than one source domain. The relevant information is always stored in the corresponding user memory 12 and federation memory 14, respectively. Thus, in the user memory 12, the special token for use with target domain B is indicated as TOKEN-B, while in the federation memory 14, the special token for use with source domain A is indicated as TOKEN-A.

In a first step 101, the user's workstation 2 sends a request message to application 3. In contrast to the normal situation illustrated in FIG. 1, the request message is a Request Access via Federative Authentication message RAFA, which contains information signalling to the target application 3 that the access request includes a request to use authentication via federation. The user's workstation 2 does not necessarily know in advance that federation is possible with this specific target application 3. Thus, a possible response to be expected may be that the target application does not support federation, in which case the user's workstation 2 must proceed by sending a normal access request message ARM.

Thus, in a second step 102, the target application 3 replies to the user and redirects the user 1 to the federation site 4. This means that the reply message contains information of the address of the target domain's federation site 4. Subsequently, in a third step 103, the user's workstation 2 resends the Request Access via Federative Authentication message RAFA to the federation site 4.

The target domain's federation site 4 comprises a database that contains information defining approved source domains and a corresponding federation site 5 of the approved source domains. Thus, in a fourth step 104, the target domain's federation site 4 recognizes the user's workstation 2 as belonging to source domain A and sends a response message RM to the user's workstation 2, containing information referring the user's workstation 2 to the source federation site 5.

In a fifth step 105, the user's workstation 2 sends an Authentication Confirmation Request Message ACRM to the source federation site 5. This Authentication Confirmation Request Message ACRM includes an indication that the authentication is intended for target domain B. If the user is not logged in yet, the Authentication Confirmation Request Message ACRM must include the user's credentials NAMEA and KEYA such as known to the source domain A, otherwise, the credentials may be dispensed with.

In a sixth step 106, in response to the Authentication Confirmation Request Message ACRM, the source federation site 5 sends an Authentication Confirmation Message ACM to the user's workstation 2, which includes an Authentication Confirmation Token ACT. This Authentication Confirmation Token ACT is the TOKEN-B recognized by the target domain's federation site 4, having value T1 for this user.

In a seventh step 107, the user's workstation 2 sends to the target domain's federation site 4 a Source Domain Token Message SDTM, which includes the Authentication Confirmation Token ACT. To the target domain's federation site 4, the Authentication Confirmation Token ACT has the meaning that the source domain A has received, checked and approved the user's credentials. The target domain's federation site 4 trusts the source domain A authentication procedure, and validates the user's request without requiring further authentication from the user. Thus, after having checked and approved the Authentication Confirmation Token ACT, having value T1 in this case, the target domain's federation site 4 in an eighth step 108 sends to the user's workstation 2 a Request Acceptance Message RAM which includes the Request Acceptance Token RAT corresponding with the Authentication Confirmation Token ACT. Thus, the Request Acceptance Token RAT has value R1 in this case.

Finally, in a ninth step 109, the user's workstation 2 sends to the target application 3 an Access Request Message ARM, which includes the Request Acceptance Token RAT, which is recognized by the target application 3 as indicating that the target federation site 4 has approved the Request Access via Federative Authentication message RAFA. Thus, the target application 3 allows the user's workstation 2 access.

While federation is thus quite comfortable to the user, it does not work if the target application 3 does not support federation, i.e. if the target application 3 requires the input of user credentials.

The present invention aims to solve this problem, i.e. to offer the same functionality of federation to the user without the user being aware that the target application 3 does not support federation, and/or without the user being hindered by this fact.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
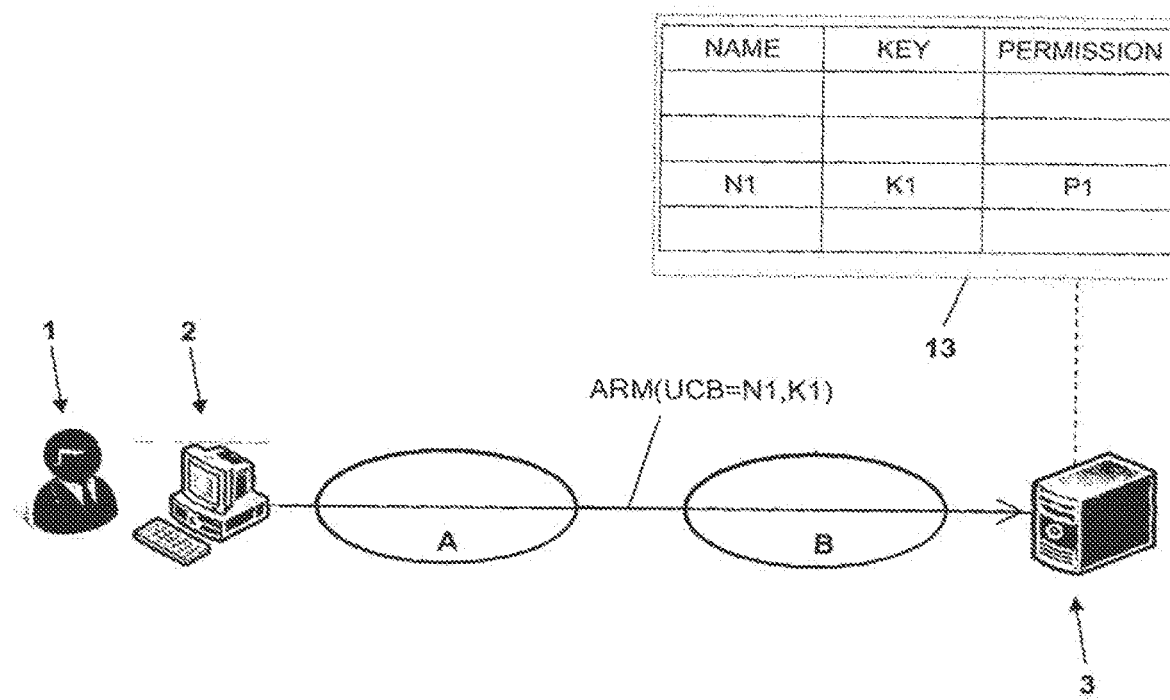
FIGS. 1-4 are diagrams illustrating information exchange between stations.
Figure 2:
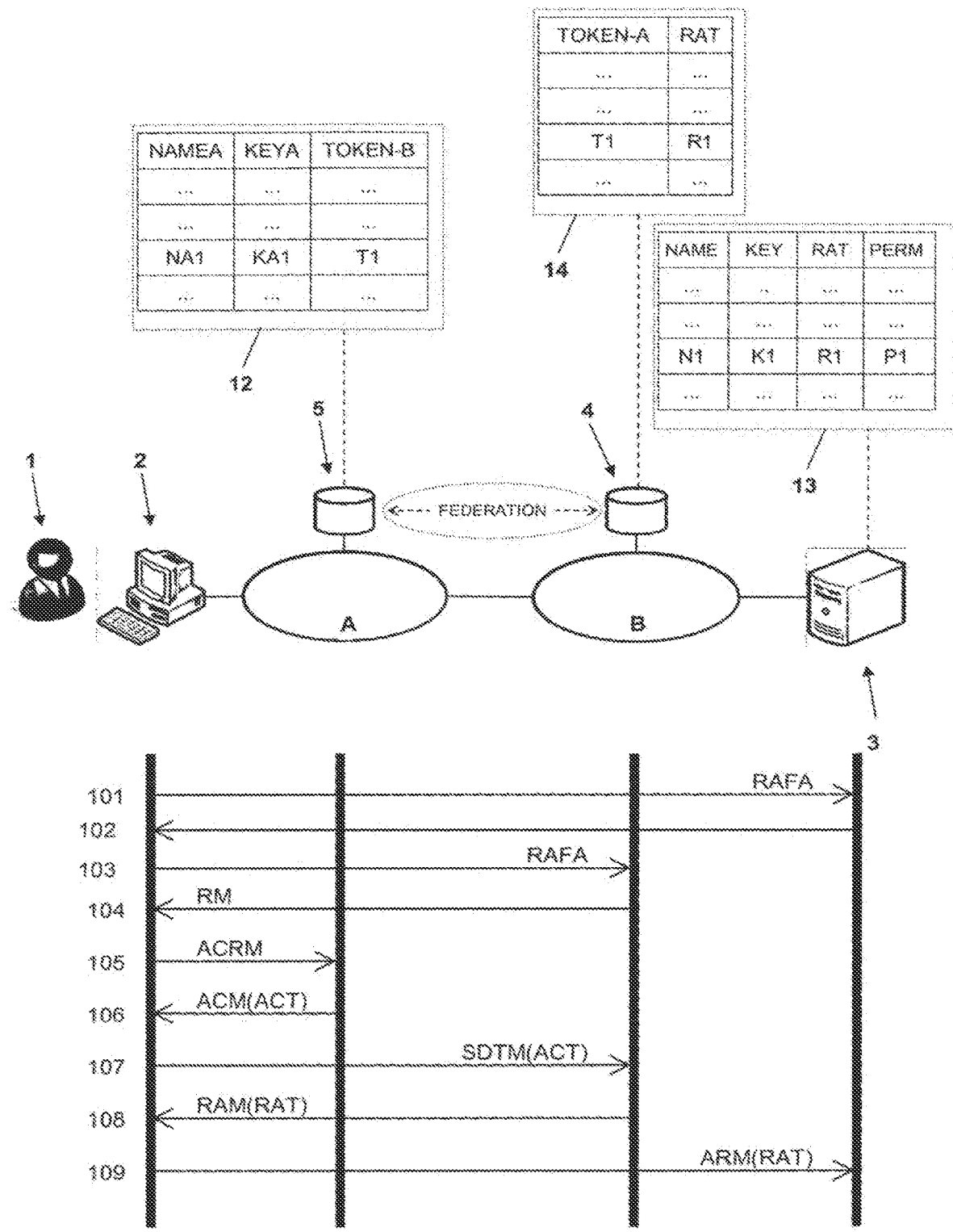
Figure 3:
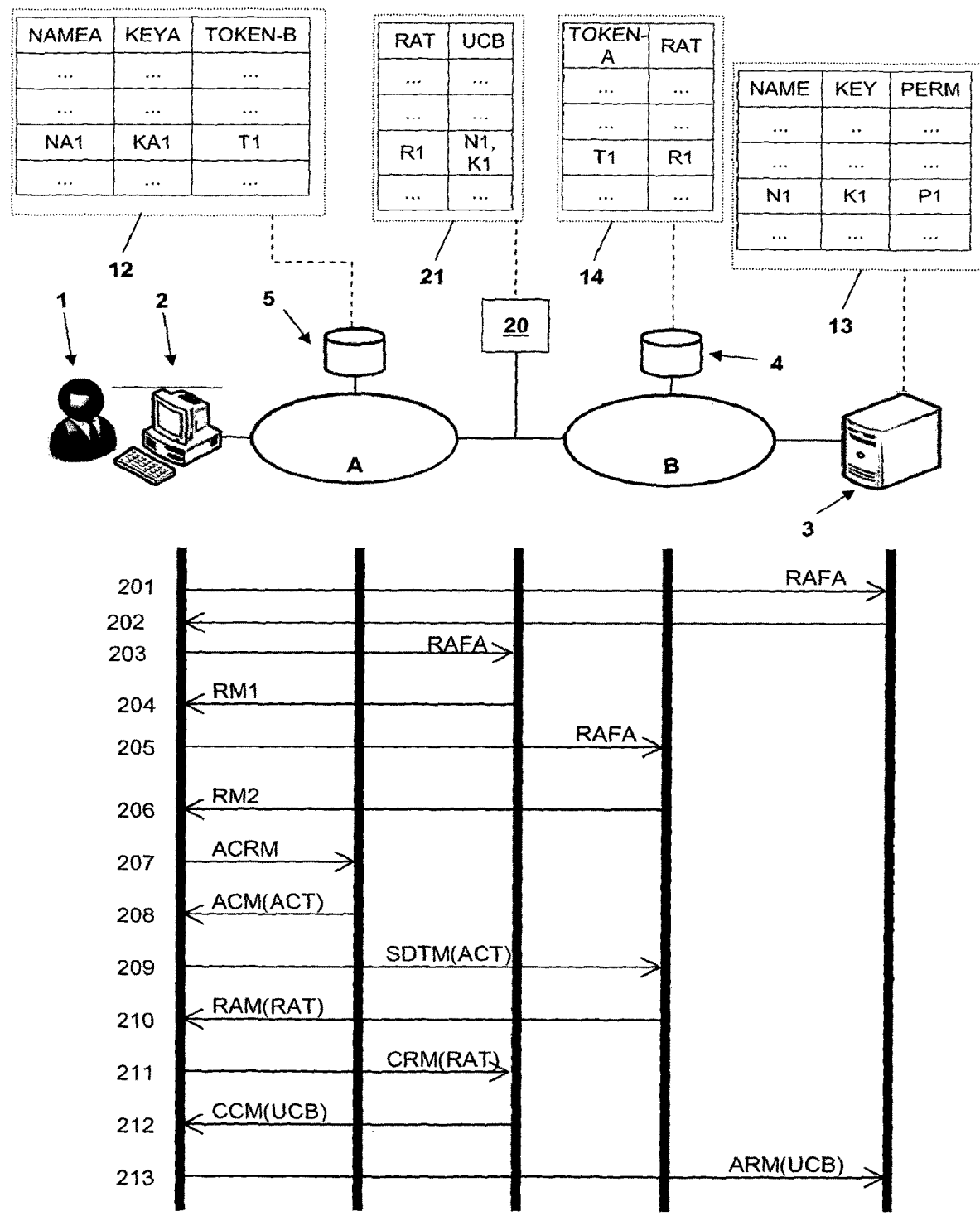

FIG. 3 is a diagram comparable to FIG. 2, schematically illustrating the process of authentication federation emulation. Different from the situation in FIG. 2, the target application 3 does not just accept a token but expects to receive user credentials (such as user name and password). The table in the credentials memory 13 does not have the column "RAT". To solve this problem, the present invention provides an Authentication Federation Emulator 20, which comprises an emulation memory 21 containing a translation table that contains, per user, a relationship between the Request Acceptance Token RAT and the user credentials UCB in domain B. The operation is as follows.

In a first step 201, the user's workstation 2 sends a Request Access via Federative Authentication message RAFA, which contains information signalling to the application 3 that the access request includes a request to use authentication via federation. In a second step 202, the target application 3 replies to the user and refers the user (more particularly: the browser operating in the user's workstation 2) to the Authentication Federation Emulator 20. Subsequently, in a third step 203, the user's workstation 2 resends the Request Access via Federative Authentication message RAFA to the Authentication Federation Emulator 20.

The Authentication Federation Emulator 20 comprises a database that contains information defining approved source domains and a corresponding federation site 5 of the approved source domains. Thus, in a fourth step 204, the Authentication Federation Emulator 20 recognizes the user's workstation 2 as belonging to source domain A, recognizes that it should emulate federative authentication, and sends to the user's workstation 2 a first response message RM1 containing information referring the user's workstation 2 to the target domain's federation site 4.

Then, in a fifth step 205, the user's workstation 2 resends the Request Access via Federative Authentication message RAFA to the target domain's federation site 4. The situation is now comparable to the situation after third step 103 in FIG. 2.

The target domain's federation site 4 comprises a database that contains information defining approved source domains, approved workstations within the respective approved source domains, and a corresponding federation site 5 of the approved source domains. Thus, in a sixth step 206, the target domain's federation site 4 recognizes the user's workstation 2 as belonging to source domain A and sends a second response message RM2 to the user's workstation 2, containing information referring the user's workstation 2 to the source federation site 5.

In a seventh step 207, the user's workstation 2 sends an Authentication Confirmation Request Message ACRM to the source federation site 5. This Authentication Confirmation Request Message ACRM includes an indication that the authentication is intended for target domain B. If the user is not logged in yet, the Authentication Confirmation Request Message ACRM must include the user's credentials NAMEA and KEYA such as known to the source domain A, otherwise, the credentials may be dispensed with.

In an eighth step 208, in response to the Authentication Confirmation Request Message ACRM, the source federation site 5 sends an Authentication Confirmation Message ACM to the user's workstation 2, which includes an Authentication Confirmation Token ACT. This Authentication Confirmation Token ACT is the TOKEN-B recognized by the target domain's federation site 4, having value T1 for this user.

In a ninth step 209, the user's workstation 2 sends to the target domain's federation site 4 a Source Domain Token Message SDTM, which includes the Authentication Confirmation Token ACT. To the target domain's federation site 4, the Authentication Confirmation Token ACT has the meaning that the source domain A has received, checked and approved the user's credentials. The target domain's federation site 4 trusts the source domain A authentication procedure, and validates the user's request without requiring further authentication from the user. Thus, after having checked and approved the Authentication Confirmation Token ACT, having value T1 in this case, the target domain's federation site 4 in a tenth step 210 sends to the user's workstation 2 a Request Acceptance Message RAM which includes the Request Acceptance Token RAT corresponding with the Authentication Confirmation Token ACT. Thus, the Request Acceptance Token RAT has value R1 in this case.

It is noted that steps 203 to 210 may be identical to steps 103 to 108 discussed above with reference to FIG. 2. Workstation 2 now has the Request Acceptance Token RAT (R1), which would be sufficient for accessing the target application 3 if this target application would accept that. But as already indicated, the target application only accepts user credentials UCB, i.e. NAME and KEY.

In an eleventh step 211, the user's workstation 2 sends to the Authentication Federation Emulator 20 a Credential Request Message CRM which includes the Request Acceptance Token RAT. The Authentication Federation Emulator 20 consults its emulation memory 21 and, after having checked and approved the Request Acceptance Token RAT, the Authentication Federation Emulator 20, in a twelfth step 212, sends to the user's workstation 2 a Credentials Conveyance Message CCM which includes the user's credentials UCB for domain B.

Finally, in a thirteenth step 213, the user's workstation 2 sends to the target application 3 an Access Request Message ARM, which includes the user credentials UCB. The target application 3 recognizes the user credentials UCB and allows the user's workstation 2 access.

It is noted that the Authentication Federation Emulator 20 could be present within target domain B. However, in that case the situation would be equivalent to the user credentials UCB being stored in the federation memory 14 of the target domain's federation site 4. Also, the Authentication Federation Emulator 20 could be present within source domain A, but in that case the situation would be equivalent to the user credentials UCB being stored in the source domain's user memory 12. An aspect of the strength of the present invention is that the Authentication Federation Emulator 20 can be implemented as an independent website, which delivers an independent emulation service to customer 1 (or A).

Figure 4:
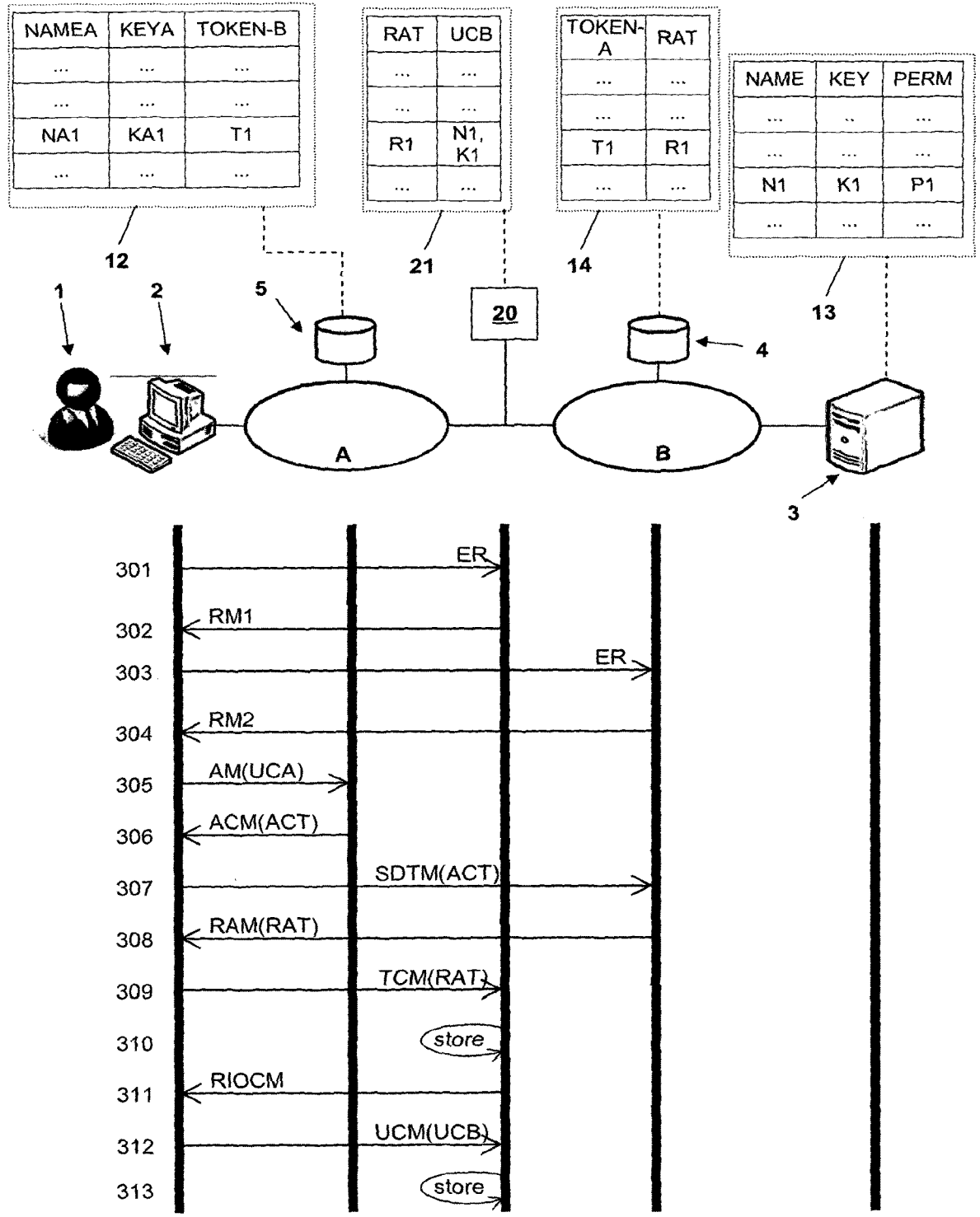

In order for federation emulation to be possible, the relation between Request Acceptance Token RAT and user credentials UC must first be defined and stored in the emulation memory 21. This process is indicated as "enrolment" and illustrated in FIG. 4.

In a first step 301, the user's workstation 2 sends an Enrolment Request message ER to the Authentication Federation Emulator 20. The Authentication Federation Emulator 20 in a second step 302 sends a first response message RM1 to the user's workstation 2, containing information referring the user's workstation 2 to the target domain's federation site 4. In a third step 303, user's workstation 2 resends the Enrolment Request message ER to the target domain's federation site 4.

The target domain's federation site 4 comprises a database that contains information defining approved source domains and a corresponding federation site 5 of the approved source domains. Thus, in a fourth step 304 step, the target domain's federation site 4 recognizes the user's workstation 2 as belonging to source domain A and sends a second response message RM2 to the user's workstation 2, containing information referring the user's workstation 2 to the source federation site 5.

In a fifth step 305, the user's workstation 2 sends an Authentication Message AM to the source federation site 5. This Authentication Message AM includes the user's credentials UCA such as known to the source domain A, in this case NA1 and KA1.

In a sixth step 306, in response to the Authentication Message AM, the source federation site 5 sends an Authentication Confirmation Message ACM to the user's workstation 2, which includes an Authentication Confirmation Token ACT. This Authentication Confirmation Token ACT is the TOKEN-B recognized by the target domain's federation site 4, having value T1 for this user.

In a seventh step 307, the user's workstation 2 sends to the target domain's federation site 4 a Source Domain Token Message SDTM, which includes the Authentication Confirmation Token ACT. To the target domain's federation site 4, the Authentication Confirmation Token ACT has the meaning that the source domain A has received, checked and approved the user's credentials. The target domain's federation site 4 trusts the source domain A authentication procedure, and validates the user's request without requiring further authentication from the user. Thus, after having checked and approved the Authentication Confirmation Token ACT, having value T1 in this case, the target domain's federation site 4 in an eighth step 308 sends to the user's workstation 2 a Request Acceptance Message RAM which includes the Request Acceptance Token RAT corresponding with the Authentication Confirmation Token ACT. Thus, the Request Acceptance Token RAT has value R1 in this case.

Workstation 2 now has the Request Acceptance Token RAT (R1), ready to be stored at the Authentication Federation Emulator 20. In a ninth step 309, the user's workstation 2 sends to the Authentication Federation Emulator 20 a Token Conveyance Message TCM which includes the Request Acceptance Token RAT, having value R1 in this case. In a tenth step 310, the Authentication Federation Emulator 20 stores the Request Acceptance Token RAT (value R1) in its emulation memory 21.

In response to the Token Conveyance Message TCM, the Authentication Federation Emulator 20 in an eleventh step 311 sends to the user's workstation 2 a Request Input Of Credentials Message RIOCM, requesting the user to enter the user credentials UCB for use in target domain B (or for use in target application 3 only). It is noted that these user credentials UCB are the user credentials that the user has agreed or will agree with target domain B or target application 3, respectively, by a normal login procedure, either before or after the present enrolment procedure.

In a twelfth step 312, the user's workstation 2 sends a User Credentials Message UCM to the Authentication Federation Emulator 20. The User Credentials Message UCM contains the user credentials UCB, in this case N1 and K1, inputted by user 1. In a thirteenth step 313, the Authentication Federation Emulator 20 stores the user credentials UCB in its emulation memory 21. The enrolment is now complete.

It should be clear that the emulation memory 21 now contains the relationship between the Request Acceptance Token RAT and user credentials UCB.

Thus, the present invention provides a method for emulating authentication federation between a source domain A and a target domain B.

A user in the source domain wishes to gain access to a target application 3 in the target domain. The target application needs to receive authorized user credentials UCB. The user has already given his credentials in the source domain A, where these credentials have already been verified.

The target domain B comprises an Authentication Federation Emulator 20 comprising a relationship between a Request Acceptance Token RAT and user credentials UCB associated with a specific user.

After having obtained the Request Acceptance Token RAT from a federation site 4 of the target domain B, the user accesses the Authentication Federation Emulator 20 for obtaining the corresponding user credentials UCB and sends them to the target application 3.

It should be clear to a person skilled in the art that the present invention is not limited to the exemplary embodiments discussed above, but that several variations and modifications are possible within the protective scope of the invention as defined in the appending claims. For instance, two or more functions may be performed by one single entity, unit or processor. Even if certain features are recited in different dependent claims, the present invention also relates to an embodiment comprising these features in common. Any reference signs in a claim should not be construed as limiting the scope of that claim.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

What is claimed is:

1. A method of accessing a target entity in a target domain based on authentication federation between a source domain and the target domain, comprising:
    receiving, by a user device in the source domain from a source federation site of the source domain, an authentication token for use at a target federation site of the target domain, the authentication token being from a first memory that correlates the authentication token to first user credentials useable in the source domain;
    sending, by the user device to the target federation site, the authentication token;
    receiving, by the user device from the target federation site, a request authentication token from a second memory that correlates the authentication token to the request authentication token;
    sending, by the user device, the request authentication token to an authentication federation emulator that comprises an emulator memory correlating the request authentication token and second user credentials useable in the target domain;
    receiving, by the user device responsive to the sending of the request authentication token to cause approval of the request authentication token by the authentication federation emulator, the second user credentials from the emulator memory of the authentication federation emulator; and
    using, by the user device, the second user credentials received from the authentication federation emulator to access the target entity in the target domain.

2. The method of claim 1, wherein the target entity is to accept the second user credentials and is to not accept the request authentication token.

3. The method of claim 1, wherein using, by the user device, the second user credentials to access the target entity in the target domain comprises:
    sending, by the user device to the target entity, the second user credentials in a message.

4. The method of claim 1, further comprising:
    sending, by the user device to the target domain, a first request to access the target entity; and
    receiving, by the user device from the target domain, a first response to the first request, the first response referring the user device to the authentication federation emulator.

5. The method of claim 4, further comprising:
    sending, by the user device to the authentication federation emulator, a second request to access the target entity; and
    receiving, by the user device from the authentication federation emulator, a second response to the second request, the second response directing the user device to the target federation site.

6. The method of claim 5, further comprising:
    sending, by the user device to the target federation site, a request access via a federative authentication message; and
    receiving, by the user device from the target federation site in response to the request access via the federative authentication message, a further response directing the user device to the source federation site.

7. The method of claim 6, further comprising:
    sending, by the user device to the source federation site, an authentication confirmation request message,
    wherein receiving the authentication token by the user device from the source federation site is responsive to the authentication confirmation request message.

8. The method of claim 1, further comprising:
prior to the user device sending the request authentication token to the authentication federation emulator, enrolling, by the user device, in an authentication service with the authentication federation emulator, including sending, by the user device to the authentication federation emulator, an enrollment request and the request authentication token received from the target federation site for storing in the emulator memory.

9. The method of claim 8, further comprising:
in response to sending the enrollment request and the request authentication token to the authentication federation emulator, receiving, by the user device from the authentication federation emulator, a request for a user of the user device to input the second user credentials to the authentication federation emulator for storing in the emulator memory.

10. The method of claim 1, wherein the emulator memory correlates request authentication tokens for different users to respective different user credentials of the different users.

11. A non-transitory machine-readable storage medium comprising instructions for accessing a target entity in a target domain based on authentication federation between a source domain and the target domain, the instructions upon execution causing a user device in the source domain to:
receive, from a source federation site of the source domain, an authentication token for use at a target federation site of the target domain, the authentication token being from a user memory that correlates the authentication token to first user credentials useable in the source domain;
send, to the target federation site, the authentication token;
receive, by the user device from the target federation site, a request authentication token from a second memory that correlates the authentication token to the request authentication token;
send the request authentication token to an authentication federation emulator that comprises an emulator memory correlating the request authentication token and second user credentials useable in the target domain;
receive, responsive to the sending of the request authentication token to cause approval of the request authentication token by the authentication federation emulator, the second user credentials from the emulator memory of the authentication federation emulator; and
use the second user credentials received from the authentication federation emulator to access the target entity in the target domain.

12. The non-transitory machine-readable storage medium of claim 11, wherein the target entity is to accept the second user credentials and is to not accept the request authentication token.

13. The non-transitory machine-readable storage medium of claim 11, wherein using the second user credentials to access the target entity in the target domain comprises:
sending, by the user device to the target entity, the second user credentials in a message.

14. The non-transitory machine-readable storage medium of claim 11, wherein the instructions upon execution cause the user device to:
send, to the target domain, a first request to access the target entity; and
receive, from the target domain, a first response to the first request, the first response referring the user device to the authentication federation emulator.

15. The non-transitory machine-readable storage medium of claim 14, wherein the instructions upon execution cause the user device to:
send, to the authentication federation emulator, a second request to access the target entity; and
receive, from the authentication federation emulator, a second response to the second request, the second response directing the user device to the target federation site.

16. The non-transitory machine-readable storage medium of claim 15, wherein the instructions upon execution cause the user device to:
send, to the target federation site, a request access via a federative authentication message; and
receive, from the target federation site in response to the request access via the federative authentication message, a further response directing the user device to the source federation site.

17. The non-transitory machine-readable storage medium of claim 16, wherein the instructions upon execution cause the user device to:
send, to the source federation site, an authentication confirmation request message,
wherein receiving the authentication token by the user device from the source federation site is responsive to the authentication confirmation request message.

18. The non-transitory machine-readable storage medium of claim 11, wherein the instructions upon execution cause the user device to:
prior to the user device sending the request authentication token to the authentication federation emulator, enroll in an authentication service with the authentication federation emulator, including sending, to the authentication federation emulator, an enrollment request and the request authentication token received from the target federation site for storing in the emulator memory.

19. The non-transitory machine-readable storage medium of claim 18, wherein the instructions upon execution cause the user device to:
in response to sending the enrollment request and the request authentication token to the authentication federation emulator, receive, from the authentication federation emulator, a request for a user of the user device to input the second user credentials to the authentication federation emulator for storing in the emulator memory.

20. A user device of a source domain, comprising:
a processor; and
a non-transitory storage medium storing instructions to access a target entity in a target domain based on authentication federation between the source domain and the target domain, the instructions executable on the processor to:
receive, from a source federation site of the source domain, an authentication token for use at a target federation site of the target domain, the authentication token from a user memory that correlates the authentication token to first user credentials useable in the source domain;
send, to the target federation site, the authentication token;
receive, by the user device from the target federation site, a request authentication token from a second memory that correlates the authentication token to the request authentication token;

send the request authentication token to an authentication federation emulator that comprises an emulator memory correlating the request authentication token and second user credentials useable in the target domain;

receive, responsive to the sending of the request authentication token to cause approval of the request authentication token by the authentication federation emulator, the second user credentials from the emulator memory of the authentication federation emulator; and use the second user credentials received from the authentication federation emulator to access the target entity in the target domain.

\* \* \* \* \*